United States Patent
Mori et al.

(10) Patent No.: US 8,847,533 B2
(45) Date of Patent: Sep. 30, 2014

(54) ACTUATOR

(75) Inventors: Masakazu Mori, Koga (JP); Daisuke Kukita, Koga (JP); Seiya Shimada, Koga (JP)

(73) Assignee: Seibu Electric & Machinery Co., Ltd., Fukuoka (JP)

( * ) Notice: Subject to any disclaimer, the term of this patent is extended or adjusted under 35 U.S.C. 154(b) by 162 days.

(21) Appl. No.: 13/500,209

(22) PCT Filed: Mar. 31, 2011

(86) PCT No.: PCT/JP2011/058169
§ 371 (c)(1),
(2), (4) Date: Apr. 4, 2012

(87) PCT Pub. No.: WO2011/125813
PCT Pub. Date: Oct. 13, 2011

(65) Prior Publication Data
US 2012/0235618 A1 Sep. 20, 2012

(30) Foreign Application Priority Data
Mar. 31, 2010 (JP) ................................ 2010-080287

(51) Int. Cl.
*H02K 23/00* (2006.01)
*H02K 37/00* (2006.01)

(52) U.S. Cl.
USPC ........................................................ 318/437

(58) Field of Classification Search
None
See application file for complete search history.

(56) References Cited

U.S. PATENT DOCUMENTS 3,464,633 A * 9/1969 Potocnik ........................ 239/425

(Continued)

FOREIGN PATENT DOCUMENTS

| JP | 05-060182 | 3/1993 |
|---|---|---|
| JP | 05231489 | 7/1993 |
| JP | 08-145126 | 6/1996 |
| JP | 10-047996 | 2/1998 |
| JP | 10-215593 | 8/1998 |
| JP | 2002-276838 | 9/2002 |

(Continued)

OTHER PUBLICATIONS

International Search Report of International Application No. PCT/JP2011/058169 dated May 17, 2011, and English Translation.

*Primary Examiner* — Bentsu Ro
*Assistant Examiner* — Devon Joseph
(74) *Attorney, Agent, or Firm* — Fay Sharpe LLP (57) ABSTRACT

There is provided an actuator in which an worm is rotationally driven by an electric motor, and in which an angular velocity of the electric motor is repeatedly fluctuated so that the rotation of the worm is carried out as if the worm is oscillated in the rotational direction thereof, to thereby decrease contact friction of the worm against a worm wheel, resulting in an improvement of an efficiency of force transmission of the worm gear mechanism.

Although the electric motor 20 is inherently controlled so that an output shaft 21 thereof is rotated at a target velocity based on a velocity command, a drive control section 40 controls the angular velocity of the output shaft 41 so as to be repeatedly increased and decreased with respect to the target velocity so that the angular velocity of the worm 11 is finely fluctuated, and thus the fluctuation of the angular velocity may be regarded as a fine general-oscillation of the rotating worm 11 in the rotational direction, whereby friction between the gear faces of the worm 11 and the gear faces of the worm wheel 12 can be decreased, resulting in an improvement of the efficiency of force transmission of the worm gear, and in increase in a driving force and a torque value to be transmitted to an object to be driven by the actuator.

6 Claims, 3 Drawing Sheets

(56) References Cited

U.S. PATENT DOCUMENTS

| | | | |
|---|---|---|---|
| 2002/0088962 A1* | 7/2002 | Takano et al. | 251/292 |
| 2003/0182997 A1* | 10/2003 | Williams | 73/152.23 |
| 2006/0175775 A1* | 8/2006 | Bolt et al. | 280/5.514 |
| 2009/0230338 A1* | 9/2009 | Sanders et al. | 251/129.01 |

FOREIGN PATENT DOCUMENTS

| | | |
|---|---|---|
| JP | 2004-257419 | 9/2004 |
| JP | 2004-257420 | 9/2004 |
| JP | 2005-256936 | 9/2005 |
| JP | 2009-192022 | 8/2009 |

\* cited by examiner

A: Control State In Which Angular Velocity Of Output Shaft Is Subjected To Increasing And Decreasing Fluctuation B: Control State In Which Angular Velocity Of Output Shaft Is Target Velocity

ACTUATOR

TECHNICAL FIELD

The present invention relates to an actuator used to open and close a valve, a gate or the like, which is provided in a fluid passage, and more particularly, to such an actuator which utilizes an electric motor, and a worm gear mechanism used as a reduction mechanism for transmitting a rotational output of the electric motor.

BACKGROUND ART

A valve or a gate is provided in a fluid passage through which a fluid such as a water flows, and is opened and closed to thereby regulate a flow of the fluid. In general, the valve or the gate is automatically opened and closed by an actuator in which an electric motor, a hydraulic motor or the like is used as a drive power source. When the valve or the gate is large, in order to obtain a necessary drive force, an output of the electric motor is reduced speed and utilized.

In many cases, a worm gear mechanism is utilized as a reduction mechanism in the actuator for the valve or the gate because it is possible to easily obtain a large reduction ratio, needed to smoothly drive the valve or the gate, by the worm gear mechanism at the minimum necessary reduction steps, and because the worm gear mechanism features a self-lock property for preventing the input side of the worm gear mechanism from being moved when a force is exerted on the output side thereof, so that an accidental movement of the valve or the gate is prevented when a driving force resulted from a flowing fluid, the force of gravity or the like is exerted on the valve or the gate.

Nevertheless, since the worm gear mechanism in which the worm and the worm wheel are in slidable contact with each other for transmission of a rotational force has a lead angle giving the self-lock property, the worm gear mechanism has an efficiency of force transmission which is inferior to that of spur gears so that there is a demand of improvement of the force transmission efficiency in the worm gear mechanism. Conventionally, in order to improve the force transmission efficiency in the worm wheel mechanism, although the gear faces have been subjected to specific processes, treatments or the like, contrived lubrication and so forth, these ides could not contribute to a great improvement of the force transmission efficiency.

Also, it has been proposed that a ultrasonic vibration is exerted on either the worm or the worm wheel so that friction on the gear faces can be decreased, in resulting in improvement of the force transmission efficiency in the worm gear mechanism. An example of this prior art worm gear mechanism is disclosed in JP-08-145126 A.

In the aforesaid prior art worm gear mechanism, the ultrasonic vibration generated by a ultrasonic oscillator supersonic is amplified and transmitted to the worm wheel engaged with the worm. When the worm is rotationally driven to thereby rotate the worm wheel, a coefficient of friction between the gear faces is decreased in comparison with the case where the ultrasonic vibration is not exerted on the worm wheel, resulting in an considerable improvement of the force transmission efficiency in the worm gear mechanism.

CITATION LIST

Patent Literature

Patent Literature 1: JP-08-145126 A

SUMMARY OF INVENTION

Technical Problem

In an actuator in which a worm gear mechanism is used as a reduction mechanism, when a technique, in which a ultrasonic vibration is exerted on the worm gear mechanism as disclosed in the aforesaid Patent Document, is applied to the actuator, it is expected that a coefficient of friction between the gear faces of the worm and the fear faces of the worm wheel is decreased so that an efficiency of force transmission can be considerably improved. Nevertheless, both the worm and the worm wheel are vibrated as a whole, and the ultrasonic vibration is always exerted as a load on radial bearings and thrust bearings for rotatably supporting the worm and the worm wheel, to thereby cause problems that not only a service life of the worm gear mechanism is shortened but also noises are produced. Further, a ultrasonic oscillator for generating the ultrasonic vibration to be transmitted to the worm gear mechanism must be provided therein in addition to a drive source such as an electronic motor and so forth, and it is necessary to provide a specific structure in the worm gear mechanism to thereby transmit the ultrasonic vibration thereto, to thereby cause problems that an arrangement of the actuator is correspondingly complicated, resulting in an increase in a production cost of the worm gear mechanism.

The present invention has been developed to solve the aforesaid problems, and aims at providing an actuator in which an worm is rotationally driven by an electric motor, in which an angular velocity of the electric motor is repeatedly fluctuated so that the rotation of the worm is carried out as if the worm is oscillate in the rotational direction thereof, to thereby decrease contact friction of the worm against a worm wheel, resulting in an improvement of an efficiency of force transmission of the worm gear mechanism.

Solution To Problem

An actuator according to the present invention is to drive an object to be driven by transmitting a rotational driving force, generated in an electric motor, to the object to be driven, through the intermediary of a worm gear reduction mechanism, and is provided with a drive control section for subjecting an angular velocity of an output shaft of the electric motor to an increasing and decreasing fluctuation within a predetermined range with respect to a target velocity which is set based on a velocity command concerning an operation of the object to be driven, such that the increasing and decreasing fluctuation is repeated, with the output shaft of the electric motor being directly coupled to a worm of the worm gear reduction mechanism.

As stated above, in the actuator according to the present invention, the electric motor defined as a drive source and the drive control section therefor are provided together with the worm gear reduction mechanism, and the electric motor is controlled so that the output shaft is rotated at the target angular velocity determined by a state of the objected to be driven and based on a velocity command concerning the operation of the objected to be driven. Also, in the drive control section, the angular velocity of the electric motor output shaft is increased and decreased within the predetermined range with respect to the target velocity based on the velocity command concerning the operation of the objected to be driven, and the control is carried out so that the increasing and decreasing fluctuation is repeated. Thus, while the worm, which is directly connected to the electric motor output shaft, is rotated, the fine fluctuation is exerted on the angular velocity of the worm so that the worm is rotated in the state which may be regarded as the fine oscillation in the rotational direction thereof. As a result, due to the generation of the fine general-oscillation, the contact state between the gear faces of the worm and the gear faces of the worm wheel is improved so that friction in the slide contact therebetween is decreased, to thereby result in progress in the force transmission efficiency of the worm gear mechanism. Thus, it is possible to further increase the driving force and the torque which are transmitted to the objected to be driven by the actuator, in comparison with a conventional actuator in which an equivalent electric motor and an equivalent reduction mechanism are used. Accordingly, if the electric motor and the reduction mechanism are miniaturized, it is possible to use them in a situation in which a large-sized actuator having a high rated performance is needed, because the real driving force and the torque can be increased. Further, it is possible to miniaturize the whole of the actuator without deterioration of the performance. Furthermore, since the general-oscillation is caused in the worm in the control of the electric motor by the drive control section, it is unnecessary to specially provide an oscillation-adding means. Thus, not only can the performance of the actuator be improved, but also it is possible to utilize the arrangement of the actuator similar to the conventional one without increasing the production cost of the actuator.

Also, the actuator according to the present invention is provided with a rotation detector for detecting a rotational state of the output shaft of the electric motor, and for outputting the rotational state as a signal, if necessary, and the drive control section carries out a servo-control of the electric motor based on the signal output from the rotation detector, and adds a fluctuation signal component having a predetermined frequency and a continuous wave of fine amplitude to a velocity-command signal given as the velocity command concerning the operation of the object to be driven, resulting in the increasing and decreasing fluctuation in the angular velocity of the output shaft of the electric motor.

As stated above, in the actuator according to the present invention, while the drive control section carries out the servo-control of the electric motor by using the rotation detector, it adds the fluctuation signal component to the velocity-command signal given as the velocity command concerning the operation of the object to be driven, so that the angular velocity of the output shaft of the electric motor is subjected to the increasing and decreasing fluctuation to thereby rotate the worm in the general-oscillation state in the rotational direction thereof. Thus, while the electric motor is suitably rotated in accordance with the object to be driven, it is possible to easily obtain the general-oscillation in the worm by only adding the fluctuation signal component to the velocity-command signal, so that the improvement of force transmission efficiency can be easily realized based on the decrease of the friction, resulting in facilitation in the performance of the actuator at low cost.

Also, the actuator according to the present invention features that the object to be driven may be a valve for opening and closing a fluid passage, if necessary, and that the drive control section controls so that the output shaft of the electric motor is subjected to the increasing and decreasing fluctuation when the valve is initially opened from a closed state and/or when the valve 70 is completely closed from a small opening state just before it is shut, and so that the angular velocity of the output shaft of the electric motor is maintained at the target velocity which is set based on the velocity command, in the opening operation and the closing operation of the valve except for the aforesaid cases.

As stated above, in the actuator according to the present invention, the object to be driven may be the valve. In the initially-opening state or the finally-shutting state in which the torque value is needed most of all in the operation of the valve, the control is carried out by the drive control section so that the angular velocity of the output shaft of the electric motor is subjected to the increasing and decreasing fluctuation, and so that the worm is rotated in the general-oscillation state in the rotational direction. Thus, it is possible to reduce the friction in the worm gear reduction mechanism to thereby improve the efficiency of force transmission so that the sufficient torque value is generated whereby the valve can be operated without any troubles. On the other hand, in an intermediate loading state in which a large torque value is not needed, it is possible to drive the electric motor so that the rated torque value can be obtained. Thus, although the electric motor and the worm gear mechanism are selected based on a standard for obtaining a necessary rated torque value, it is possible to output the maximum torque value, if necessary. That is, it is possible to use a small-sized electric motor and so forth in which an output force is suppressed in a rated operation in which the worm is not driven in general-oscillation state, so that a production cost of the actuator can be reduced, and so that it is possible to entirely and compactly constitute the actuator.

Also, a control method for an electric motor according to the present invention is to transmit a generated rotational driving force to an object to be driven, provided at a downstream side thereof, through the intermediary of a gear mechanism, and an angular velocity in an output shaft of the electric motor, which is directly coupled to an input gear of the gear mechanism, is subjected to an increasing and decreasing fluctuation within a predetermined range with respect to a target velocity which is set based on a velocity command concerning an operation of the object to be driven, such that the increasing and decreasing fluctuation is repeated.

As stated above, in the control method for the electric motor according to the present invention, the electric motor is provided together with the gear mechanism including a gear train, and the electric motor is controlled so that the output shaft is rotated at the target angular velocity determined by a state of the objected to be driven and based on a velocity command concerning the operation of the objected to be driven. Also, in the drive control section, the angular velocity of the electric motor output shaft is increased and decreased within the predetermined range with respect to the target velocity based on the velocity command concerning the operation of the objected to be driven, and the control is carried out so that the increasing and decreasing fluctuation is repeated. Thus, while an input gear of the gear mechanism, which is directly connected to the electric motor output shaft, is rotated, the fine fluctuation is exerted on the angular velocity of the input gear so that the input gear is rotated in the state which may be regarded as the fine oscillation in the rotational direction thereof. As a result, due to the generation of the fine general-oscillation, the contact state between the gear faces of the input gear and gear faces of a gear engaged with the input gear is improved. Especially, when the gear mechanism is a worm gear reduction mechanism, a worm of which is defined as the input gear, friction in the slide contact between the gear faces in the worm gear reduction mechanism is decreased, to thereby result in progress in the force transmission efficiency of the worm gear mechanism. Thus, it is possible to further increase the driving force and the torque which are transmitted to the objected to be driven, in comparison with a conventional actuator in which an equivalent electric motor and an equivalent reduction mechanism are used. Accordingly, if the electric motor and the reduction mechanism are miniaturized, it is possible to use them in a situation in which a large-sized actuator having a high rated performance is needed, because the real driving force and the torque can be increased. Further, it is possible to miniaturize the whole of the actuator without deterioration of the performance. Furthermore, since the general-oscillation is caused in the input gear in the control of the electric motor by the drive control section, it is unnecessary to specially provide an oscillation-adding means. Thus, not only can the performance be improved, but also it is possible to utilize the arrangement of the actuator similar to the conventional one without increasing the production cost.

DESCRIPTION OF EMBODIMENTS (First Embodiment of the Invention)

Figure 1:
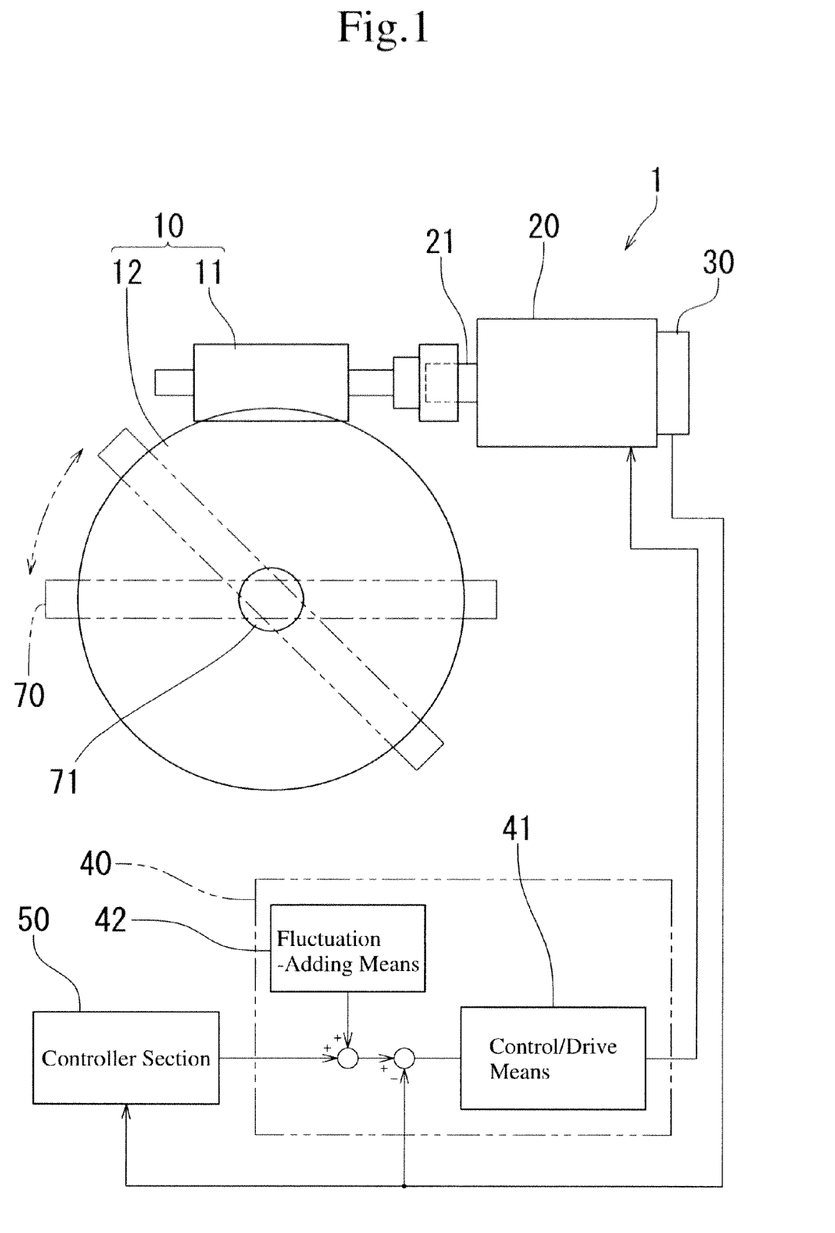
FIG. 1 is a schematic view for explaining an actuator according to a first embodiment of the present invention.
Figure 2:
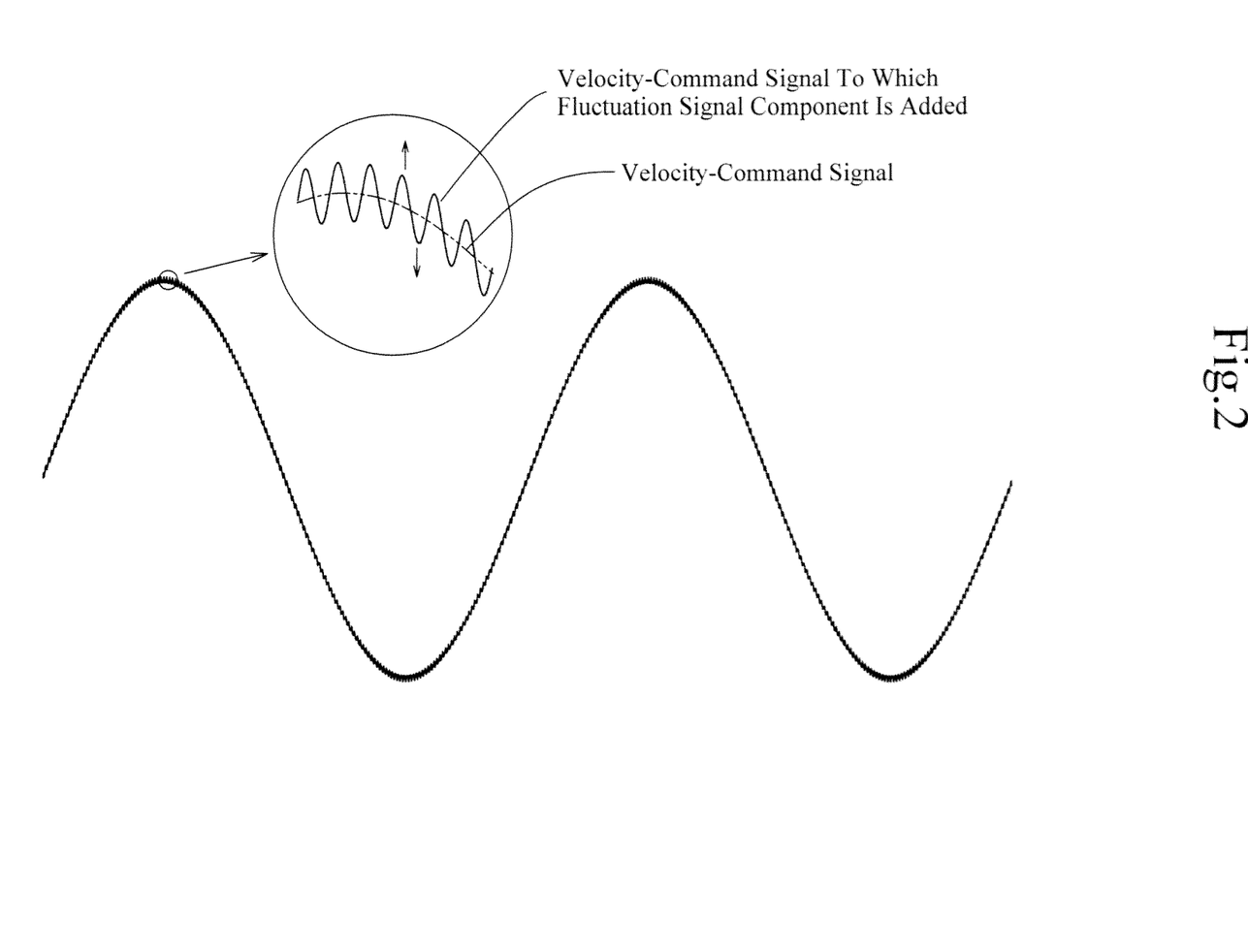
FIG. 2 is an explanatory view showing a time-changing wave of a velocity-command signal in a drive control section of the actuator according to the first embodiment of the present invention.

With reference to FIGS. 1 and 2, an actuator according to a first embodiment of the present invention will now be explained below.

In these drawings, the actuator according to the first embodiment of the present invention includes: a worm gear reduction mechanism 10 for transmitting a valve driving force to a support shaft 71 by which a valve 70 defined as an object to be driven is supported so as to be integrally rotatable; an electric motor 20 connected to the worm gear reduction mechanism 10 so that the valve driving force is given to the valve 70 through the worm gear reduction mechanism 10; a rotation detector 30 for detecting rotational information of an output shaft 21 of the electric motor 20; a drive control section 40 for controlling the electric motor 20 in accordance with an output signal of the rotation detector 30; and a controller section 50 for outputting a velocity-command signal to the drive control section 40 when receiving an operational command from an external controller, with the velocity-command signal representing that the valve 70 is opened at a predetermined ratio of valve opening.

The worm gear reduction mechanism 10 is arranged as a conventional mechanism having a worm 11 which is connected to the output shaft 21 so as to be rotationally driven, and a worm wheel 12 which is engaged with the worm 11, and which is mounted on the support shaft 71 so as to be integrally rotatable, so that the rotational driving force obtained from the electric motor 20 is reduced speed while transmitting the rotational driving force from the worm 11 to the worm wheel 12, and is then transmitted to the support shaft 71, whereby the valve 70 is rotated together with the support shaft 71 by a predetermined rotational angle so as to be opened and closed. Thus, a further detailed explanation on the mechanism is omitted.

In the worm gear reduction mechanism 10, the valve 70 is opened and closed by rotating the worm wheel 12 mounted on the support shaft 71 joined to the valve 70. Similarly, although, in a reduction mechanism for a butterfly valve, a globe valve or the like, a valve 70 is opened and closed by rotating it, the present invention is not limited to only this reduction mechanism. As long as a valve is opened and closed by utilizing the rotational force of an electric motor, it is possible to use another reduction mechanism in which a valve 70 is opened and closed by driving it upward and downward. For example, as a reduction mechanism for a gate valve or the like, a support shaft may have a male thread portion which is threadedly engaged with a female thread portion joined to a worm wheel, and the worm wheel is rotationally driven by the electric motor through the worm gear reduction mechanism, so that the support shaft is linearly driven so as to open and lose a valve.

The electric motor 20 comprises a servo-motor, the output shaft 21 of which is directly joined to the worm 11 of the worm gear reduction mechanism 10, and the servo-motor is electrically connected to the drive control section 40 so as to be rotated under control of the drive control section. The driving force generated by the electric motor 20 is reduced speed by the worm gear reduction mechanism 10, and is then transmitted to the support shaft 71 of the valve 70 defined as the object to be driven, so that the valve 70 is rotated by a predetermined rotational angle.

The rotation detector 30 is provided beside an end of the electric motor 20, and converts a rotational displacement of the electric motor output shaft 21 into an electrical signal, with the rotation detector 30 being formed as a known sensor such as an encoder, a resolver or the like, which outputs such an electrical signal. The rotation detector 30 is connected to the drive control section 40 and the controller section 50 so that the electrical signal can be output thereto, and is used for a servo-control of the electric motor 20 by the drive control section 40 and the controller section 50. However, the ratio of valve opening may be calculated and obtained in another manner based on output signals of the rotation detector 30.

Note that a sensor, which is previously and integrally installed in the electric motor 30 so as to be output a servo-control signal, may be used as the rotation detector 30.

By the drive control section 40, not only a servo-control of the electric motor 20 is carried out based on the output signal output from the rotation detector 30, but also an angular velocity of the output shaft 21 of the electric motor 20 is increased and decreased within a predetermined range with respect to a target velocity which is set based on a velocity command concerning an operation of the valve 70, and the control is carried out so that the increasing and decreasing fluctuation is repeated.

Concretely, in the servo-control of the electric motor 20 defined as the servo-motor, a control/drive means 41 feeds a current to the electric motor while carrying out a velocity control, a filter control, a current control and so forth, and a fluctuation signal component, which is output from a fluctuation-adding means 42, and which has a predetermined high frequency and a continuous wave of fine amplitude (e.g., a sine wave), is added to the velocity-command signal output from the controller section 50 as the velocity command concerning the operation of the valve 70 defined as the object to be driven, at a location on a line between the controller section 50 and the control/drive means 41, where is upstream from a location at which a feedback of velocity information really detected by the rotation detector 30 is carried out, resulting in the increasing and decreasing fluctuation in the angular velocity of the electric motor output shaft 21.

Usually, since the velocity-command signal is fed to the drive control section 40 as a current signal, the drive control section 40 adds a predetermined fluctuating current component to the velocity-command current signal to thereby control the electric motor 20.

With this control of the drive control section 40, while maintaining the rotation of the output shaft 21 of the electric motor 20 in the same rotational direction as that based on the velocity command, the increasing and decreasing fluctuation, in which the angular velocity of the output shaft 21 is slightly increased and decreased within the predetermined range with respect to the target velocity, is repeatedly caused at a very short cycle, i.e., the angular velocity is finely fluctuated. The fluctuation of the angular velocity may be regarded as a fine general-oscillation of the output shaft 21 in the rotational direction, and this fine general-oscillation state also occurs in the worm 11 which is integrally rotated together with the output shaft 21. Thus, similar to a case where an ordinary simple oscillation is exerted on both a worm and a worm wheel, a contact state between the gear faces of the worm 11 and the gear to faces of the worm wheel 12 is improved, resulting in decrease in friction therebetween.

In this arrangement of the worm 11 and the output shaft 21 of the electric motor 20, when the state, in which the real angular velocity is increased and decreased with respect to the target velocity based on the velocity command, is put in other words, using a number of revolution which can be easily measured, it is possible to say that both the output shaft 21 and the worm 11 are rotated at an increasing and decreasing rotational difference with respect to the target number of revolution based on the velocity command.

An amplitude of the fluctuation signal component, which is added to the velocity-command signal in the drive control section 40, is defined as a range of the number of revolution in which a rotational difference to the target number of revolution really caused in the revolution of the output shaft is included, i.e., an increasing and decreasing fluctuation range of the angular velocity of the output shaft (i.e., an amplitude of an increasing and decreasing fluctuation wave). Also, a frequency of the fluctuation signal component is defined as a frequency of the increasing and decreasing fluctuation in the angular velocity of the output shaft.

In the drive control section 40, a relationship between the amplitude of the fluctuation signal component to be added to the velocity-command signal and the maximum rotational difference to the target number of revolution really caused in the revolution of the output shaft as well as a relationship between the frequency of the fluctuation signal component and the frequency of the increasing and decreasing fluctuation in the real angular velocity of the output shaft are previously prepared and determined, and the fluctuation signal component which is set as a suitable amplitude and frequency wave is added to the velocity-command signal by the fluctuation-adding means 42 so that an increasing and decreasing fluctuation of the angular velocity corresponding to a desirable oscillation state is caused in both the real output shaft and the worm.

For example, when the target number of revolution of the electric motor 20 (i.e., the rated number of revolution) is 3,000 rpm, it is preferable that the frequency of the increasing and decreasing fluctuation of the angular velocity of the output shaft 21 falls within a range from 1 to 10 kHz, and that the maximum rotational difference (i.e., the offset number of revolution) to the target number of revolution is 250 rpm. In short, in the drive control section 40, the fluctuation signal component having a predetermined amplitude and a predetermined frequency which are previously confirmed so that the aforesaid control can be obtained is added to the velocity-command signal. After the addition, the velocity-command signal is defined as a signal in which the original velocity-command signal overlaps with a sine-like fluctuation wave having a high frequency and a small amplitude. Especially, as shown in FIG. 2, when the electric motor is an AC servo-motor, the velocity-command signal having an alternating wave overlaps with a wave having the considerably higher frequency than that of the velocity-command signal and the considerably smaller amplitude than that of the velocity-command signal. Thus, while an oscillation based on the increasing and decreasing fluctuation of the angular velocity is given to the output shaft, no influence is exerted to the servo-control in which a number of revolution generally equal to the target number of revolution is maintained.

Note, in the servo-control of the electric motor 20 by the drive control section 40, since it is known that the rotational control of the electric motor 20 is carried out based on the velocity-command signal, using the feedback of the rotational velocity information of the electric motor output shaft obtained from the output signal of the rotation detector 30, a further detailed explanation on the servo-control is omitted.

The controller section 50 is subjected to an operational command for opening the valve 70 at a predetermined ratio of valve opening through the intermediary of an external manipulation, a cable communication using an electrical cable or an optical cable by a command control means or a wireless communication, and gains positional information on a valve-opening position from the output signal of the rotation detector 30 to carry out a positional control, thereby outputting the velocity-command signal to the drive control section 40.

Note, in the operation of the electric motor 20 carried out by the controller section 50 and the drive control section 40, since a basic sequential control, in which the electric motor 20 is stopped after the valve 70 is opened and closed to move it to a predetermined ratio of valve opening, is a servo-control concerning a known valve opening and closing regulation, a further detailed explanation is omitted.

Note, the controller section 50 may have an inputting and outputting means for a general-purpose memory medium such as a memory card and so forth, through which setting data, historical information data such as a number of operation times and so forth stored in the interior thereof are transferred to an external piece of equipment for management and analysis, whereby it is possible to easily gain and effectively utilize the data accumulated by the running of the actuator.

Next, an operation of the actuator according to the embodiment of the present invention will be explained. On the condition that a command signal for opening or closing the valve 70 is input from an outside to the controller section 50 so that a velocity-command signal is fed from the controller section 50 to the drive control section 40, the electric motor 20 is initially driven by the drive control section 40 so as to be rotated, and thus a rotational driving force is transmitted to the support shaft 71 of the valve 70 through the intermediary of the worm gear reduction mechanism 10.

When the electric motor 20 is rotationally driven, the drive control section 40 not only carries out a servo-control together with the controller section 50, based on a signal output from the rotation detector 30, but also adds a fluctuation signal component, having a wave featured with a predetermined suitable amplitude and a predetermined frequency, to the velocity-command signal transmitted to the electric motor 20 for operating the valve 70.

In the control based on the command signal after the addition is performed, while the output shaft 21 of the electric motor 20 is rotated in the rotational direction based on the velocity-command signal, the angular velocity of the output shaft 21 is increased and decreased with respect to the target velocity within the range which is determined by the amplitude of the fluctuation signal component, and the increasing and decreasing fluctuation is repeated at a frequency which is determined by the frequency of the fluctuation signal component. Note, when the increasing and decreasing fluctuation of the angular velocity of the output shaft 21 is put in other words, using a number of revolution thereof, it is possible to say that the real number of revolution of the output shaft 21 is increased and decreased with respect to the target number of revolution within a range of rotational difference which is determined by the amplitude of the fluctuation signal component.

The state in which the increasing and decreasing fluctuation of the angular velocity is caused in the output shaft 21, i.e., the state in which the angular velocity s finely fluctuated between a high speed side and a low speed side may be regarded as a fine general-oscillation of the output shaft 21 in the rotational direction, and this fine general-oscillation of the output shaft 21 also occurs in the worm 11 integrally connected to the output shaft 21. Thus, similar to a case where an ordinary simple oscillation is added to both a worm and a worm wheel, in the worm gear reduction mechanism 10, friction between the gear faces of the worm 11 and the gear faces of the worm wheel 12 is decreased, resulting in improvement of an efficiency of force transmission. Also, due to the general oscillation of both the output shaft 21 and the worm 11 in the rotational thereof, bearings for the output shaft 21 and worm 11 are hard to be subjected to useless force in thrust and radial directions, to thereby suppress bad influence to be exerted thereon.

With the improvement of the force transmission efficiency of the worm gear reduction mechanism 10, in comparison with a case where the same electric motor and the same reduction mechanism are used, but the general-oscillation state is not caused in a similar manner to a conventional servo-control, it is possible to further increase an output of the actuator to thereby drive the valve 70. Note, similar to an ordinary valve opening/closing control, when the valve 70 is moved to position corresponding to a predetermined ratio of valve opening, the electric motor 20 is stopped, resulting in completion of the opening and closing operation.

As stated above, in the actuator according to this embodiment of the present invention, the electric motor 20 defined as a drive source and the drive control section 40 are provided together with the worm gear reduction mechanism 10, and the electric motor 20 is controlled so that the output shaft 11 is rotated at the target angular velocity determined by a state of the valve 70 and based on a velocity command concerning the operation of the valve. Also, in the drive control section 40, the angular velocity of the electric motor output shaft 21 is increased and decreased within the predetermined range with respect to the target velocity based on the velocity command concerning the operation of the valve 70, and the control is carried out so that the increasing and decreasing fluctuation is repeated. Thus, while the worm 11, which is directly connected to the electric motor output shaft 21, is rotated, the fine fluctuation is exerted on the angular velocity of the worm 11 so that the worm 11 is rotated in the state which may be regarded as the fine oscillation in the rotational direction thereof. As a result, due to the generation of the fine general-oscillation, the contact state between the gear faces of the worm 11 and the gear faces of the worm wheel 12 is improved so that friction in the slide contact therebetween is decreased, to thereby result in progress in the force transmission efficiency of the worm gear mechanism. Thus, it is possible to further increase the driving force and the torque which are transmitted to the valve by the actuator, in comparison with a conventional actuator in which an equivalent electric motor and an equivalent reduction mechanism are used. Accordingly, if the electric motor and the reduction mechanism are miniaturized, it is possible to use them in a situation in which a large-sized actuator having a high rated performance is needed, because the real driving force and the torque can be increased. Further, it is possible to miniaturize the whole of the actuator without deterioration of the performance.

Also, in a conventional worm gear mechanism, ordinarily, a worm and a worm wheel are formed of different materials so that it is possible to obtain a suitable friction in a slide contact between the gear faces of the worm and the gear faces of the worm wheel. For example, the worm is formed of a steel material, and the worm wheel is formed of a copper alloy such as a phosphor bronze material which is relatively expensive, to thereby obtain a suitable coefficient of friction therebetween. On the other hand, according to the present embodiment, in the control of the electric motor 20, the fine fluctuation is exerted on the angular velocity of the rotating worm 11 to thereby improve the contact state between the gear faces of the worm 11 and the gear faces of the worm wheel 12 is improved, resulting in decrease in the friction in the slide contact therebetween. Thus, it is unnecessary to use a specific low frictional material for the worm wheel mechanism. Especially, for the worm wheel, it is possible to use a steel material or the like which is easily available, resulting in decrease in a production cost of the worm gear mechanism.

In addition, since the friction between the gear faces of the worm and the gear faces of the worm wheel can be made small, lubricating conditions for the worm gear mechanism can be relieved so that it is unnecessary to use a specific lubricating oil, for example, a lubricating oil containing an extreme pressure additive, for suppressing the friction under the severe lubricating conditions of the slide contact between the gear faces of the worm and the gear faces of the worm wheel. Thus, not only can a lubricating cost be decreased, but also an influence on the nature environment can be made small in that the extreme pressure additive featuring a large environment load is not used.

(Second Embodiment of the Invention)

In the actuator according to the above-mentioned first embodiment, while the electric motor 20 is rotationally driven based on the command concerning the operation of the valve 70, the angular velocity of the output shaft 21 of the electric motor 20 is controlled by the drive control section 40 so as to be always subjected to the increasing and decreasing fluctuation, so that the general-oscillation state occurs in the output shaft 21 and worm 11 in the rotational direction thereof. However, the present invention is not limited to the first embodiment. In a second embodiment of the present invention, the control in which the output shaft 21 of the electric motor 20 is subjected to the increasing and decreasing fluctuation by the drive control section 40 and the control in which the angular velocity of the output shaft 21 is maintained at the target velocity based on the velocity command without being the subjected to the increasing and decreasing fluctuation may be switched to each other in accordance with a degree of the ratio of valve opening.

Figure 3:
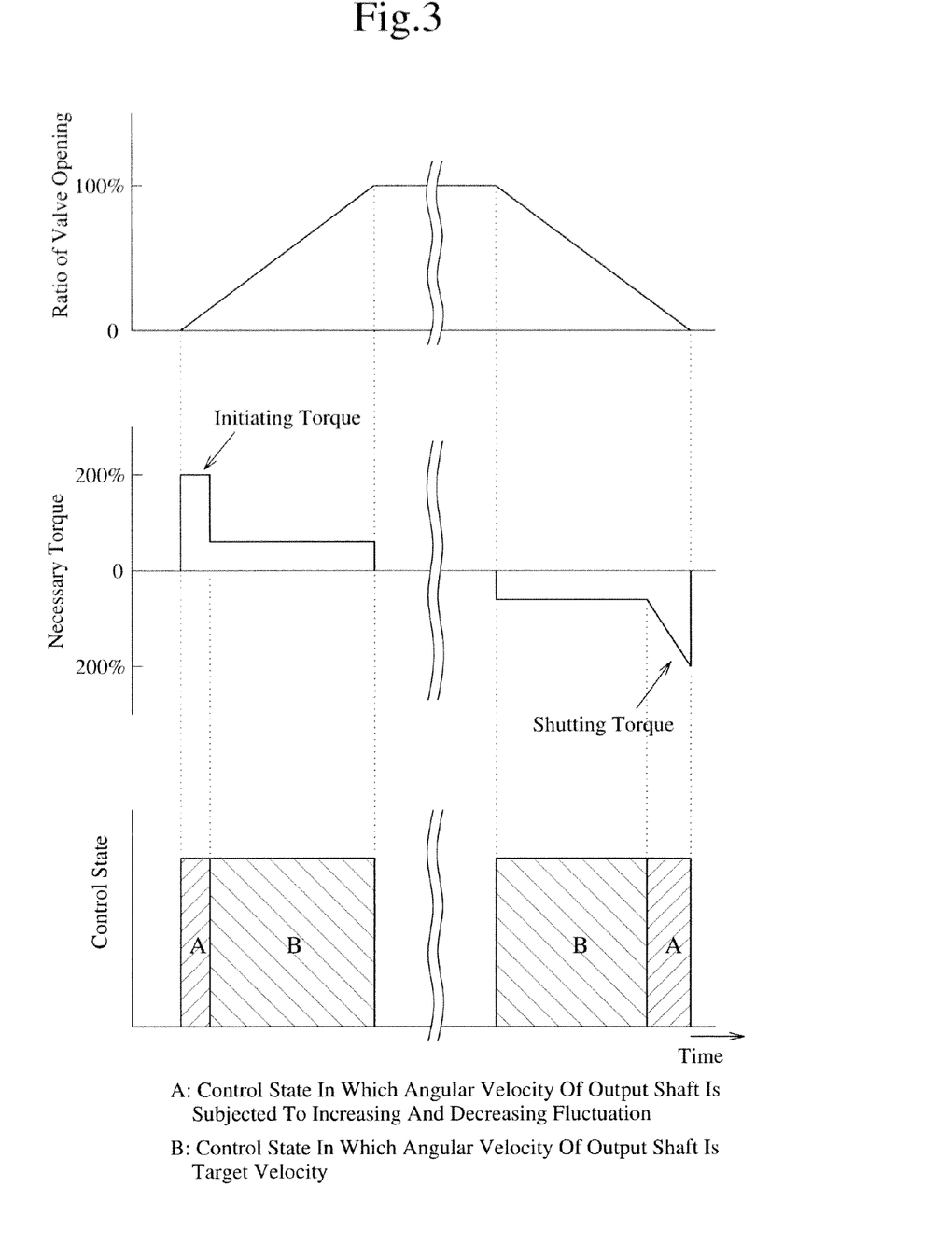
FIG. 3 is an explanatory view showing a change of a control-switching state in accordance with a ration of valve opening in an actuator according to a second embodiment of the present invention.

In a valve, it is known that it is necessary to operate the valve with a larger torque value than a rated torque value needed at a middle ratio of valve opening, which may be defined as an initiating torque value which is needed when the valve is opened from a closed state or as a shutting torque value which is needed when the valve is completely closed from a small opening state just before it is shut. In accordance with this characteristic, as shown in FIG. 3, the angular velocity of the output shaft 21 of the electric motor 20 is controlled by the drive control section 40 so as to be subjected to the increasing and decreasing fluctuation only when the valve 70 is initially opened from the closed state or only when the valve 70 is completely closed from the small opening state just before it is shut. In the opening operation and the closing operation of the valve 70 except for these cases, the drive control section 40 switches to the control in which the angular velocity of the output shaft 21 is maintained at the target velocity based on the velocity command.

In a case where the electric motor 20 is driven to thereby open and close the valve 70, a signal corresponding to a rotational displacement of the electric motor 20 is output from the rotation detector 30, and a ratio of valve opening of the valve 70 can be calculated based on the output signal so that it is possible to monitor the ration of valve opening. Thus, for example, during the closing operation of the value 70, when the valve 70 reaches the ratio of valve opening at which it must be operated at the large torque value such as the shutting torque value, the drive control section 40 switches from the control state in which the angular velocity of the output shaft 21 is the target velocity to the control state in which the angular velocity of the output shaft 21 is subjected to the increasing and decreasing fluctuation. In contrast, during the initially-opening operation of the valve 70, when the state in which the large torque value such as the initially-opening torque value is needed is shifted to the state in which the valve can be operated at a torque value which is equal to or more than the rated torque value, the drive control section 40 switches from the control state in which the angular velocity of the output shaft 21 is subjected to the increasing and decreasing fluctuation to the control state in which the angular velocity of the output shaft 21 is the target velocity.

As stated above, in the initially-opening state or the finally-shutting state in which the torque value is needed most of all in the operation of the valve 70, the control is carried out by the drive control section 40 so that the angular velocity of the output shaft 21 of the electric motor 20 is subjected to the increasing and decreasing fluctuation, and so that the worm 11 is rotated in the general-oscillation state in the rotational direction. Thus, it is possible to reduce the friction in the worm gear reduction mechanism 10 to thereby improve the efficiency of force transmission so that the sufficient torque value is generated whereby the valve 70 can be operated without any troubles. On the other hand, in an intermediate loading state in which a large torque value is not needed, it is possible to drive the electric motor 20 so that the rated torque value can be obtained. Thus, although the electric motor and the worm gear mechanism are selected based on a standard for obtaining a necessary rated torque value, it is possible to output the maximum torque value, if necessary. That is, it is possible to use a small-sized electric motor and so forth in which an output force is suppressed in a rated operation in which the worm is not driven in general-oscillation state, so that a production cost of the actuator can be reduced, and so that it is possible to entirely and compactly constitute the actuator.

Also, in this embodiment, although the control is carried out so that the angular velocity of the output shaft of the electric motor is subjected to the increasing and decreasing fluctuation at both the time when the valve is initially opened from the closed state and the time when the valve is completely closed from the small opening state just before it is shut, it is possible to carry out the control so that the angular velocity of the output shaft of the electric motor is subjected to the increasing and decreasing fluctuation only either the time when the valve is initially opened from the closed state or the time when the valve is completely closed from the small opening state just before it is shut.

Further, in the actuator according to each of the above-mentioned embodiments, although the driving force is transmitted from the electric motor 20 to the support shaft 71 of the valve 70 through the intermediary of the worm gear reduction mechanism 10 to thereby open and close the valve 70, the present invention may be applied to a gate opening/closing mechanism for another valve in which a plate-like gate is moved upward and downward or laterally to thereby open and close a fluid passage. Further, when the valve or the gate is supported by not the support shaft but a support member such as a chain, a wire or the like, of course, it is possible to use suitable intermediate elements to transmit the driving force between the worm wheel and the support member such as the chain, the wire or the like.

Furthermore, in the actuator according to each of the above-mentioned embodiments, although reference is made to only the arrangement in which the driving force is transmitted from the electric motor 20 to the support shaft 71 united with the object to be driven, i.e., the valve 70, through the intermediary of the worm gear reduction mechanism 10, it is possible to adopt another arrangement in which the driving force, which is input from the electric motor to the worm gear mechanism, is selectively switched to a driving force input based on a person's operation, e.g., a rotational operation obtained by manually rotating a handle, so that the support shaft for the valve and so forth can be rotated with the person's operation in exchange for the electric motor operation through the intermediary of the worm gear reduction mechanism, when a power failure, in which an ordinary electric power cannot be obtained, happens. In this switchable arrangement, before the worm of the worm gear reduction mechanism can be subjected to the general-oscillation state when the electric motor is driven, the electric motor output shaft must be united with the worm. Thus, when the worm is manually driven by the handle, a driven portion of the manual handle is linked with the electric motor through the intermediary of the worm. With taking this into consideration, during the manual operation of the handle, it is necessary to prevent a rotational operation of the electric motor by an interlock switch formed as a physical switch mechanism, so that the supply of electric power to the electric motor is cut off by operating the interlock switch when the driving force input is switched to the manual operation side. Nevertheless, if the physical switch mechanism is damaged, and if the power failure state is returned to the usual power supply state, the electric motor may be accidentally supplied with the electric power during the manual operation of the handle so that an accident in which an operator falls into a dangerous situation may happen. For this reason, it is preferable to provide a dual interlock system, including the aforesaid interlock switch, in which the supply of electric power to the electric motor is cut off while the electric motor output shaft is rotated due to not the electric power supply but the rotation of the worm caused by the operation of the manual handle. For example, due to the fact that the manual handle and the electric motor output shaft are linked with each other, the electric motor output shaft is rotated by the rotation of the manual handle, and thus the electric motor generates an electric power as a dynamo so that the generated electric power is input to the drive control section. While the input electric power is detected by the drive control section, it recognizes that the actuator is in the manual operation state, and the control is carried out that no electric power is supplied to the electric motor so as to prevent the electric motor from being driven during the manual operation of the handle, to thereby insure safety.

The control method, in which the angular velocity of the electric motor output shaft is repeatedly subjected to the increasing and decreasing fluctuation, may be applied to not only the electric motor of each of the above-mentioned embodiments but also an electric motor for driving a reduction unit using a gear mechanism, a driving force transmission unit or the like. Similarly, in this case, it is possible to regulate a contact state in the gear faces between the gears engaged with each other, so that a coefficient of friction in the slide contact therebetween can be decreased, and it can be also expected that the face pressures in the gear faces are relieved so that a permissible Hertz stress can be made large. The decrease in the friction coefficient based on the regulation of the slide contact state may occur in a gear mechanism including gears except for a worm, so that it is possible to exert a good influence on a design concerning slide faces of gears.

EXAMPLE

In the actuator according to the present invention, a torque value was measured when control was carried out so that an electric motor output shaft was subjected to a general-oscillation in a rotational direction thereof, and an efficiency of force transmission was calculated. Then, these results were estimated by comparing them with the results obtained by a comparative example in which the aforesaid control was not carried out.

First, in the actuator according to the present invention, a torque value of the electric motor itself was measured when the control was carried out so that an electric motor output shaft was subjected to the general-oscillation in the rotational direction thereof. Also, the control was carried out so that the target number of revolution (i.e., the rated number of revolution) of the electric motor was 3,000 [rpm]; an that the frequency of the increasing and decreasing fluctuation in the output shaft was 2,500 Hz; and so that the maximum rotational difference ((.e., the offset number of revolution) to the target number of revolution was 250 [rpm].

Also, in the comparative example, a torque value of the electric motor itself was measured when the aforesaid control was not carried out. The conditions including the number of revolution and so forth were the same as in the aforesaid example of the present invention.

Next, in the inherent state of the actuator according to the present invention, in which the electric motor is coupled to the worm gear reduction mechanism, a torque value in an output terminal (i.e., the worm wheel) of the actuator was measured when the control was carried out so that the electric motor output shaft was subjected to the general-oscillation in the rotational direction thereof. Similarly, in the comparative example, a torque value in the output terminal of the actuator was measured when the aforesaid control was not carried out. Note that a ratio of reduction in the worm gear reduction mechanism of the actuator was 1/40.

Then, based on the measured torque values (the electric motor output torque values) of the electric motor itself obtained by the aforesaid measurements, the measured torque values (the actuator output torque values) of the whole of the actuator, and the ratio of reduction, an efficiency of the worm gear reduction mechanism were calculated in each of the cases where when the control was carried out and where the control was not carried out, by using the following formula:

(Efficiency)=(Actuator Output Torque)÷(Electric Motor Output Torque)×(Reduction Ratio)

The measured torque values results and the calculated efficiencies of the worm gear reduction mechanism are shown in Table 1.

TABLE 1

| | In Case Where Control Was Carried Out | In Case Where No control Was Carried Out |
|---|---|---|
| Output Torque Of Electric Motor | 1.27N * m | 1.15N * m |
| Output Torque Of Actuator | 26N * m | 33N * m |
| Efficiency | 51% | 72% |

As shown in Table 1, although the output torque value of the electric motor itself somewhat fell when the aforesaid control was carried out, the actuator output torque value of the whole of the actuator was more increased when the aforesaid control was carried out in comparison with the case where the aforesaid control was not carried out. Also, the efficiency calculated from the torque values was improved by about 40% by carrying out the aforesaid control.

As being apparent from the foregoing, in the actuator according to the present invention, it is possible to improve the force transmission efficiency in the worm gear reduction mechanism by carrying out the control so that the electric motor output shaft is subjected to the general-oscillation in the rotational direction thereof, and the torque value given to the object to be driven can be more increased by carrying out the aforesaid control in comparison with the case where the aforesaid control is not carried out.

REFERENCE SIGNS LIST

1 Actuator
10 Worm Gear Reduction Mechanism
11 Worm
12 Worm Wheel
20 Electric Motor
21 Output Shaft
30 Rotation Detector
40 Drive Control Section
41 Control/Drive Means
42 Fluctuation-Adding Means
50 Controller Section
70 Valve
71 Support Shaft

The invention claimed is:
1. An actuator for driving an object to be driven by transmitting a rotational driving force, generated in an electric motor, to the object to be driven, through the intermediary of a worm gear reduction mechanism, characterized by the fact:
that there is provided a drive control section for (a) controlling an output shaft of said electric motor to rotate at a target velocity which is set based on a velocity-command signal, (b) subjecting an angular velocity of the output shaft of said electric motor to a repeated increasing and decreasing fluctuation within a predetermined range with respect to the target velocity while maintaining said rotation of said output shaft in a rotational direction based on the velocity-command signal, and (c) adding a fluctuation signal component having a predetermined frequency and a continuous wave of fine amplitude to the velocity-command signal, said velocity-command signal being a signal in which a fluctuation waveform of the fluctuation signal component is superimposed on a velocity command concerning an operation of said object to be driven; and that the output shaft of said electric motor is directly coupled to a worm of said worm gear reduction mechanism.

2. The actuator as set forth in claim 1, characterized by the fact:

that there is provided a rotation detector for detecting a rotational state of the output shaft of said electric motor, and for outputting said rotational state as a signal; and that said drive control section carries out a servo-control of said electric motor based on the signal output from said rotation detector.

3. The actuator as set forth in claim 1, characterized by the fact:

that said object to be driven is a valve for opening and closing a fluid passage; and that said drive control section controls so that the output shaft of said electric motor is subjected to the increasing and decreasing fluctuation when said valve is initially opened from a closed state and/or when said valve is completely closed from a small opening state just before it is shut, and so that the angular velocity of the output shaft of said electric motor is maintained at the target velocity which is set based on the velocity command, in the opening operation and the closing operation of said valve except for the aforesaid cases.

4. A control method for an electric motor to transmit a generated rotational driving force to an object to be driven, provided at a downstream side thereof, through the intermediary of a gear mechanism, characterized by the fact that an output shaft of said electric motor is rotated at a target velocity which is set based on a velocity-command signal, an angular velocity in the output shaft of said electric motor, which is directly coupled to an input gear of said gear mechanism, is subjected to a repeated increasing and decreasing fluctuation within a predetermined range with respect to the target velocity while maintaining said rotation of said output shaft in a rotational direction based on the velocity-command signal, and adding a fluctuation signal component having a predetermined frequency and a continuous wave of fine amplitude to the velocity-command signal, said velocity-command signal being a signal in which a fluctuation waveform of the fluctuation signal component is superimposed on a velocity command concerning an operation of said object to be driven.

5. The actuator as set forth in claim 2, characterized by the fact:

that said object to be driven is a valve for opening and closing a fluid passage; and that said drive control section controls so that the output shaft of said electric motor is subjected to the increasing and decreasing fluctuation when said valve is initially opened from a closed state and/or when said valve is completely closed from a small opening state just before it is shut, and so that the angular velocity of the output shaft of said electric motor is maintained at the target velocity which is set based on the velocity command, in the opening operation and the closing operation of said valve except for the aforesaid cases.

6. A method for controlling an electric motor to transmit a generated rotational driving force to an object to be driven, provided at a downstream side thereof, through the intermediary of a gear mechanism, the method comprising:

controlling an output shaft of said electric motor to rotate at a target velocity which is set based on a velocity-command signal;

subjecting an angular velocity of the output shaft of said electric motor to a repeated increasing and decreasing fluctuation within a predetermined range with respect to the target velocity while maintaining said rotation of said output shaft in a rotational direction based on the velocity-command signal;

adding a fluctuation signal component having a predetermined frequency and a continuous wave of fine amplitude to the velocity-command signal, said velocity-command signal being a signal in which a fluctuation waveform of the fluctuation signal component is superimposed on a velocity command concerning an operation of said object to be driven; and directly coupling said output shaft of said electric motor to a worm of said worm gear reduction mechanism.

\* \* \* \* \*